UNITED STATES PATENT OFFICE.

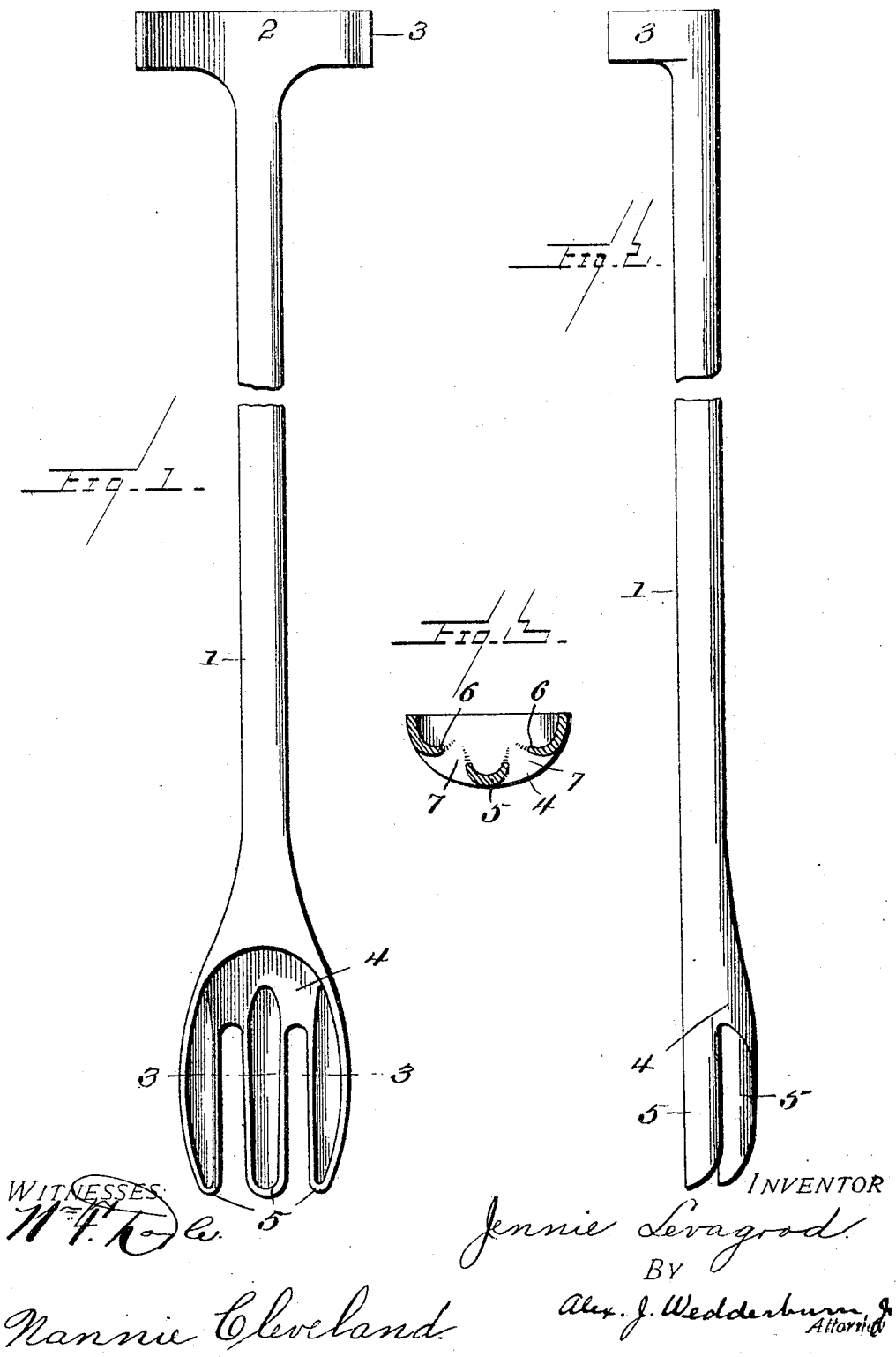

JENNIE LEVAGOOD, OF OKLAHOMA, OKLAHOMA TERRITORY.

BATTER-SPOON.

No. 808,056.  Specification of Letters Patent.  Patented Dec. 19, 1905.

Application filed December 19, 1904. Serial No. 237,548.

*To all whom it may concern:*

Be it known that I, JENNIE LEVAGOOD, a citizen of the United States, residing at Oklahoma, in the county of Oklahoma and Territory of Oklahoma, have invented certain new and useful Improvements in Batter-Spoons, of which the following is a specification.

This invention relates to certain new and useful improvements in culinary devices, and pertains more particularly to what may be termed a "spoon" designed for mixing batter.

It has for its object, among others, to provide a novel form of batter-spoon having means for engaging and receiving the forearm of the person using the same, so as to prevent strain on the muscles and to strengthen and assist the arm during the act of stirring the batter.

A further object is to form the bowl of the spoon in such a manner as to obtain better results and secure more thorough mixing of the ingredients of the batter with less exertion on the part of the person using the same.

Other objects and advantages of the invention will hereinafter appear and the novel features thereof will be particularly pointed out in the appended claim.

The invention is clearly illustrated in the accompanying drawings, which, with the numerals of reference marked thereon, form a part of this specification, and in which—

Figure 1 is a front elevation of my improved batter-spoon. Fig. 2 is a side elevation thereof. Fig. 3 is a cross-section on the line 3 3 of Fig. 1.

Like numerals of reference indicate like parts in the several views.

Referring now to the details of the drawings, 1 designates the shank or handle of the spoon, which may be of any desired length, preferably of such length that the end 2 thereof shall engage the forearm when in use near the elbow. This end 2 is formed with the curved portion 3 at right angles to the handle or shank, which curved portion is of a shape to fit the curvature of the forearm and to form a rest therefor. The opposite end or bowl 4 is substantially semicircular in cross-section, as seen in Fig. 3, and is provided with a plurality of fingers 5, the shape of which is seen clearly in Fig. 3. The center finger 5 is substantially crescent shape in cross-section, while the side fingers curve inwardly toward each other, as seen at 6, so that each of the fingers is concave; but the adjacent edges of the same do not overlap, but provide sufficient spaces or clearances 7 for the passage of the batter during the act of stirring. It will be noticed that the shape of the fingers is such that while they readily engage the batter during the act of stirring the batter readily falls therefrom as the spoon is passed therethrough, the batter falling from the one finger being taken up by the other, with the result that the thorough admixture is obtained in a short time and with little exertion.

What is claimed as new is—

A batter-spoon having its bowl formed with a plurality of fingers substantially crescent-shaped in cross-section with the center one in a plane below that of the others.

In testimony whereof I affix my signature in presence of two witnesses.

JENNIE LEVAGOOD.

Witnesses:
CHARLES A. McCOLLISTER,
EDGAR BOON.